Dec. 27, 1960 W. J. McINTYRE 2,966,136
SALT AND POWDER DISPENSER FOR ANIMALS
Filed June 9, 1959
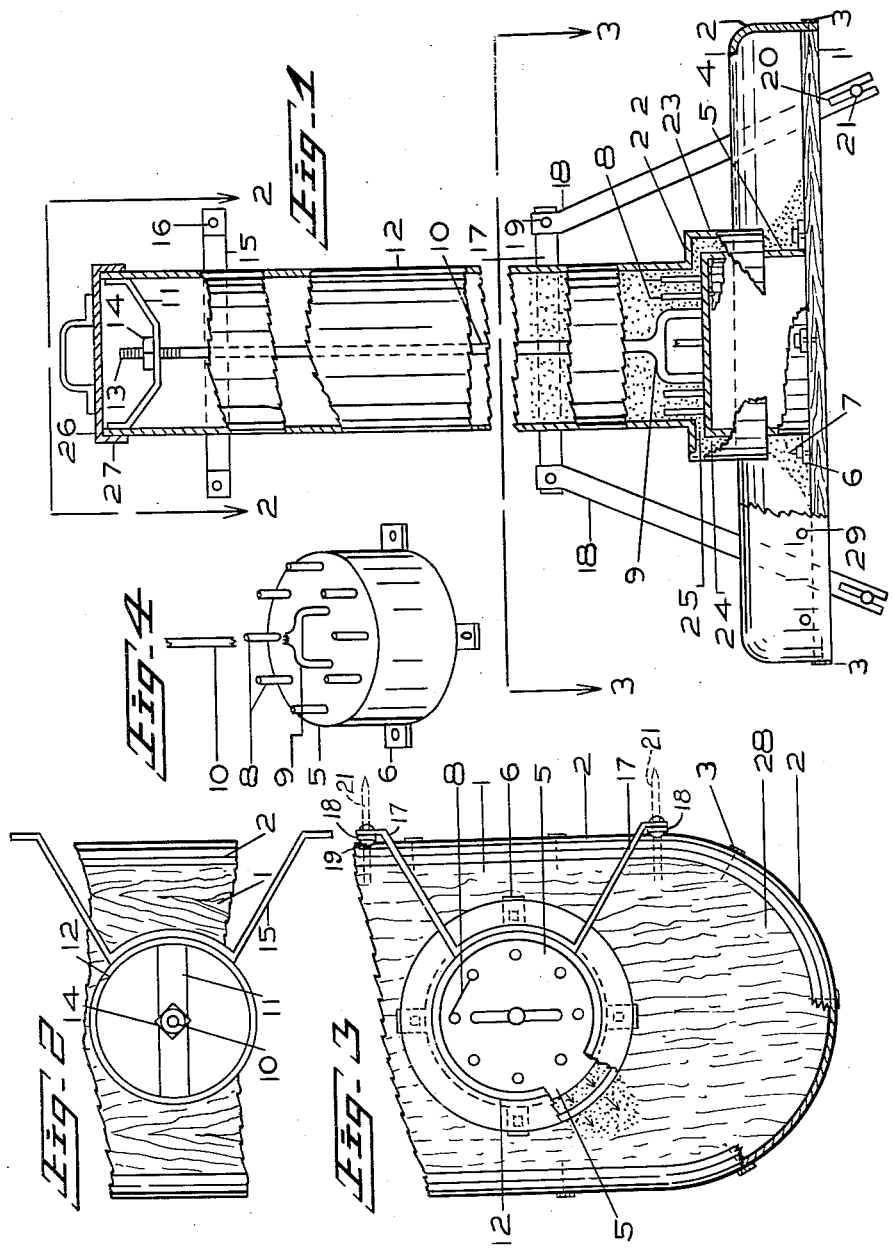

United States Patent Office 2,966,136
Patented Dec. 27, 1960

2,966,136

SALT AND POWDER DISPENSER FOR ANIMALS

William John McIntyre, Box 100, Swift Current, Saskatchewan, Canada

Filed June 9, 1959, Ser. No. 819,119

1 Claim. (Cl. 119—53.5)

This invention relates to salt and powder dispensers for animals and from which the animal can obtain a constant supply of salt and of the various powders fed to animals, having particular reference to cattle and other livestock of this character.

In the raising of livestock it is desirable to maintain a supply of salt or powdered concentrates constantly available to the animals. This is more usually dispensed by hand and in consequence the supply is maintained intermittently and often is inadequate. It is also usually exposed to the weather and the rain washes the salt or powder away.

The present device is designed to make these materials available to livestock by feeding salt and powdered additives from a dispensing container into a trough or basket by agitation of the trough by the animals, and by so doing to ensure a constant flow of the material to the trough in quantities regulated by the requirements of the animals without attention other than refilling the container as required. The device is further designed to maintain the supply of salt and additives protected from the weather and to break up lumps of salt or other material as it is fed from the container.

In the drawings, illustrating a preferred embodiment of the invention,

Fig. 1 is a front view of a salt and powder dispensing device in accordance with my invention, shown broken away in part and in part sectioned to disclose the interior of the container and base and of the trough.

Fig. 2 is a top view of the body of the container, taken on a line 2—2 of Figure 1, shown with the cover removed and including the upper attaching bracket and a fragment of the feeding trough, and further showing the salt regulating rod and the mounting bracket for the rod.

Fig. 3 is a view taken on a line 3—3 of Figure 1, shown broken away in part and in part sectioned.

Fig. 4 is a perspective view of the container base, including the regulating rod, the latter being shown as broken away in part.

In the drawings the salt dispenser is shown as comprising a trough or basket 1, preferably of wood as a protection to the animals in freezing weather, and including an upstanding side 2 secured to the base by nails 3, the side having its upper marginal portion 4 turned inward to prevent escape of salt from the trough.

On the trough 1 is attached a base 5, the base including a series of tabs 6 by which it may be secured on the trough by nails 7. The base is preferably circular and includes a series of upstanding pegs 8 designed to break up lumps of material passing through the dispenser.

On the base 5 is secured the forked end 9 of an upstanding rod 10 that engages a bracket 11 secured transversely in the upper end of a cylindrical container 12, the rod having a threaded end 13 and salt flow adjusting nut 14 by which the base may be suspended by the rod vertically adjustable for raising and lowering the base in relation to the open lower end of the container.

The container 12 is attachable to a fixed support by an upper bracket 15 that has openings 16 for nailing the bracket to the support, and there is included a lower bracket 17 fixed to the container and to which legs 18 attach by rivets 19, the legs including slots 20 for nails 21 by which the container may be adjustable for suspension of the trough properly aligned with the container.

The lower end of the container includes a skirt portion formed by an annular flange 22 with depending skirt 23 adapted to overlie the base and leave a space 24 between the skirt an base. This space 24 combines with an interval 25 that may be formed between the lower end of the container and the base to provide a passage for material from the container to the trough. The flow of material may be regulated by raising or lowering the base 5 in relation to the container by means of the nut 14 so as to increase or decrease the interval 25, or the flow of material may be cut off entirely.

The skirt 22 must be of considerable depth so that any material discharged onto the base and allowed to flow down into the trough and that is consequently exposed to the weather may not, when moistened by rain or snow, come into contact with the main supply of material discharging from the container, and this also applies to the moistening of the material by the tongues of animals licking the powder or salt.

A container capable of carrying fifty pounds of material or thereabouts is preferably used mounted on a post available to the animals.

The container is preferably cylindrical and has a smooth inner surface designed to facilitate the flow of material from the container without lumping or forming cakes, so that the salt or powder as it settles in the container is maintained free to flow through the outlet.

Initially, when the base is lowered by turning the nut 14, a limited amount of salt or powder escapes from the container forming a pile comprising a small quantity of material around the base. An animal using the dispenser agitates the trough and this will cause additional material to escape, so that a continuous flow is assured when the dispenser is in use. The flow is regulated by the use of the dispenser by the animals and may be further regulated by means of the salt flow adjusting nut 14.

The container includes a cover 26 for the open upper end, and it is essential that this cover have a close fitting depending flange 27 to ensure that no moisture enters the container, and so far as possible excluding moist air. For this a plastic cover has been found very suitable.

The bottom of the trough may be pebbled, as indicated in part at 28 in Figure 1, causing animals to press heavily and agitate the trough. Also, the side 2 may be perforated, as at 29, for draining moisture from the trough.

What I claim and wish to secure by Letters Patent is:
In a salt and powder dispenser of a character having a container including a body portion open at the lower end and a trough, and including a rod and means in the upper end portion of the container from which the rod is suspended vertically adjustable and capable of swinging sidewise therefrom, an upstanding base fixed on the trough and suspended by the rod, said base having a flat upper side with a surface area in excess of the area of the lower end of the body portion of the container and with its peripheral portion projecting outward thereof, a flange on the lower end of the body portion of the container projecting outwardly of the peripheral portion of the base, and a depending skirt on the flange.

References Cited in the file of this patent

UNITED STATES PATENTS

| | | |
|---|---|---|
| 1,000,667 | Clark | Aug. 15, 1911 |
| 2,429,777 | Smith | Oct. 28, 1947 |
| 2,503,886 | Olson | Apr. 11, 1950 |
| 2,785,792 | Cordis | Mar. 19, 1957 |
| 2,808,029 | Geerlings | Oct. 1, 1957 |
| 2,884,899 | Jackes et al. | May 5, 1959 |

FOREIGN PATENTS

| | | |
|---|---|---|
| 210,111 | Great Britain | Jan. 31, 1924 |
| 713,353 | France | Aug. 11, 1931 |